Oct. 19, 1965
E. B. CONNELLY
3,212,167
DEVICES FOR SHAPING CHASERS AND METHOD OF CONTOURING THE SAME
Filed Oct. 7, 1963
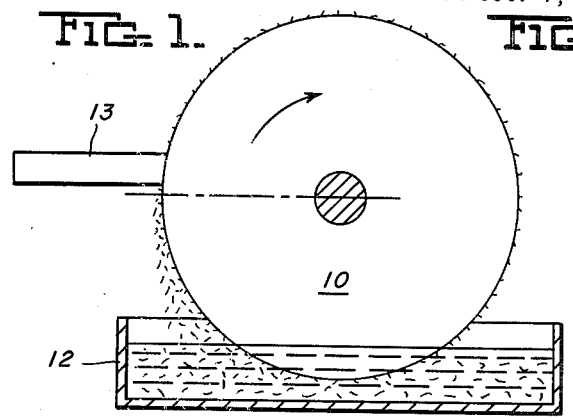
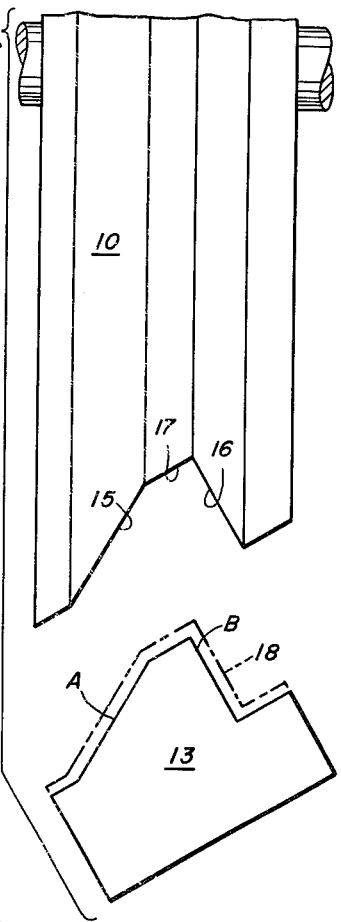
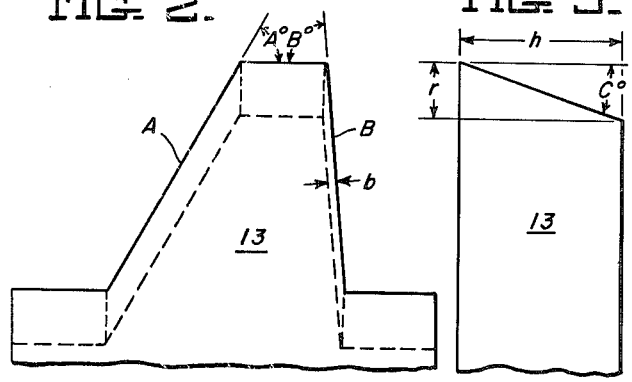
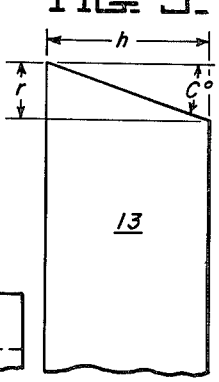
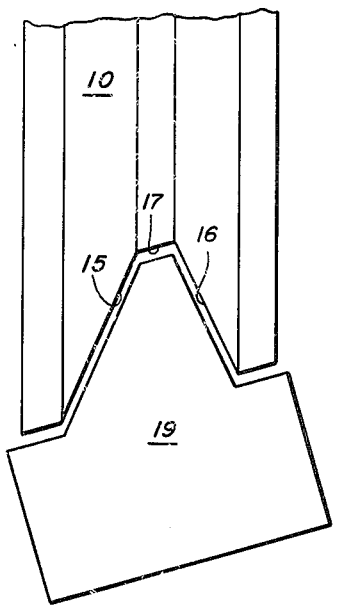
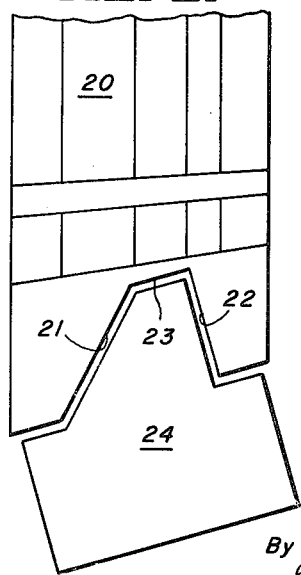
INVENTOR.
EUGENE B. CONNELLY
By Donald G. Dalton
Attorney

United States Patent Office 3,212,167
Patented Oct. 19, 1965

3,212,167
DEVICES FOR SHAPING CHASERS AND METHOD OF CONTOURING THE SAME
Eugene B. Connelly, Churchill Borough, Pa., assignor to United States Steel Corporation, a corporation of New Jersey
Filed Oct. 7, 1963, Ser. No. 314,161
3 Claims. (Cl. 29—103)

This invention relates to improved devices for shaping chasers used to cut threads, and to methods of contouring such devices.

Chasers may be either of a hard carbide material or of tool steel. Carbide chasers are shaped to the proper profile on a rotating lapping wheel of a relatively soft steel. The wheel is partially immersed in a suspension of a fine abrasive particles which become embedded in the circumferential surface. Subsequently these particles act on the chaser to erode its surface wherever they contact. Tool steel chasers are shaped similarly on a rotating milling cutter. In either event the contour or the shaping device must be designed to conform with the profile desired in the chaser. As hereinafter explained, there is a special problem in shaping chasers which have unequal flank angles, since the face with the steeper angle may rub excessively against the shaping device, and even so it is difficult to attain sufficient clearance in this face.

An object of the present invention is to provide an improved device for shaping chasers and overcoming the problems which result when the chasers have unequal flank angles. A further object is to provide a device for shaping chasers, which device has surfaces extending at equal angles with respect to the axis of rotation for shaping the chaser flanks, thus assuring that the flanks have the same clearances even though the flank angles are unequal.

A further object is to provide a method of contouring a shaping device in which the need to form difficult angles and small clearances is avoided.

In the drawing:

FIGURE 1 is a diagrammatic side elevational view, not to scale, illustrating the relation between a lapping wheel and a chaser during a lapping operation;

FIGURE 2 is an enlarged top plan view of a portion of a chaser illustrating the angles and clearances of the surfaces thereof;

FIGURE 3 is a side elevational view of the chaser shown in FIGURE 2;

FIGURE 4 is a diagrammatic top plan view, not to scale, of a lapping wheel constructed in accordance with my invention and a carbide chaser;

FIGURE 5 is a diagrammatic top plan view, not to scale, illustrating my method of contouring a lapping wheel; and FIGURE 6 is a diagrammatic top plan view, not to scale, of a milling cutter constructed in accordance with my invention and a tool steel chaser.

FIGURE 1 shows a relatively soft metal lapping wheel 10 which can be constructed in accordance with my invention or otherwise. The wheel is connected to a suitable drive (not shown) which rotates it in a clockwise direction. The lower portion of the wheel dips into a pan 12, which contains abrasive particles suspended in a liquid carrier. The surface of the wheel picks up some of the particles. A carbide chaser 13, mounted in a suitable jig (not shown), is pressed lightly against the circumference of the wheel. The pressure of the harder carbide embeds the particles in the surface of the wheel. The embedded particles erode the surface of the chaser to the proper profile. The chaser is vertically offset from the radius of the wheel in order to form the surfaces beneath its thread-cutting edges with proper clearances. In the illustration the longitudinal center line of the chaser is horizontal, and the bottom of the chaser is spaced slightly above the horizontal radius of the wheel. Typical proportions may be a wheel diameter of about 11 inches, a chaser of thickness (vertical dimension in FIGURE 1) about 3/16 inch, and the distance between the bottom of the chaser and the horizontal radius about 1/4 inch.

FIGURES 2 and 3 show a typical chaser 13 which has unequal left and right flank angles A and B, a clearance angle C behind the cutting edge at its crest, and thickness $h$. When the chaser is shaped on a conventional device, as illustrated, the clearance $r$ at the crest equals $h \tan C$, and the clearance $b$ at the steeper flank equals $r \cos B$. As either flank angle approaches 90°, the clearance behind the cutting edge on this flank becomes very small. For example, if the cutter has flank angles A and B of 60° and 89°, a clearance angle C at the crest of 10° and a thickness $h$ of 3/16 inch, the flank clearance $b$ is only .0006 inch. In use, once .0006 inch of material wears from the cutting edge, the whole cutter flank rubs from top to bottom on the work, and its cutting action ceases.

FIGURE 4 shows a lapping wheel 10 constructed in accordance with my invention to overcome the problem of small clearances, as well as to facilitate the shaping operation. The wheel body has circumferential surfaces 15 and 16 for shaping the flanks A and B of the chaser 13 and a circumferential surface 17 for shaping the crest. I contour the lapping wheel so that its surfaces 15 and 16 extend at approximately equal angles with respect to the axis of the wheel. The surface 17 is oblique or "distorted" with respect to the axis, instead of lying parallel thereto, as in a conventional lapping wheel designed to form a chaser of similar shape. The angle of distortion equals $$\frac{B-A}{2}$$

in the example 14° 30'. Surface 17, of course, may have a different angular relation to the wheel axis, depending on the particular thread form which the chaser is to cut. In some instances this surface may have a radius, or the surfaces 15 and 16 may intersect directly. When a chaser 13 having unequal flank angles A and B is pressed against surfaces 15 and 16, the same thickness of material is removed from each flank, as indicated by the dot-dash line 18. Likewise the chaser has equal clearances on each flank. The flank clearance $b$ (FIGURE 2) equals $$\frac{h \tan C \cos \left( B - \frac{B-A}{2} \right)}{\cos \frac{B-A}{2}}$$

In the example the flank clearance is .0091, approximately 15 times that obtained with a conventional lapping wheel. This clearance is sufficient for good cutting characteristics as well as long chaser life.

FIGURE 5 illustrates the procedure I follow in contouring a lapping wheel 10 of the configuration shown in FIGURE 4. I engage the lapping wheel with a cutting tool 19 of a configuration similar to that desired by the chaser. I feed the tool in a direction perpendicular to the axis of the wheel along a radius thereof. In this manner I contour the wheel accurately to the proper configuration without having to form an unduly steep surface for shaping the chaser flanks.

FIGURE 6 illustrates a milling cutter 20 formed in accordance with the same principles. The cutting edges 21 and 22 extend at equal angles to the axis of rotation, and the crest cutting edge 23 is distorted. The angles are determined as already described. I use this cutter in shaping a tool steel chaser 24, and I obtain the same benefits as in the carbide chaser.

From the foregoing description it is seen that my invention affords a simple device for shaping chasers used in thread cutting and obtaining better flank clearness. The device also avoids any need to form surfaces at too steep an angle for ready lapping or cutting.

While I have shown and described certain preferred embodiments of my invention, it is apparent that other modifications may arise. Therefore, I do not wish to be limited to the disclosure set forth but only by the scope of the appended claims.

I claim:

1. A device for shaping a thread-cutting chaser which has unequal flank angles, said device comprising a body rotatable on an axis and having spaced-apart first and second circumferential surfaces inclined at approximately equal angles with respect to said axis for shaping the two flanks of the chaser, and a third circumferential surface intersecting said first and second surfaces each at a different angle for shaping the crest of the chaser, said third surface being distorted with respect to said axis by an angle which equals approximately half the difference between the two flank angles of the chaser, whereby the device shapes each flank of the chaser to approximately the same clearance.

2. A device as defined in claim 1 which is in the form of a lapping wheel for shaping carbide chasers and in which said surfaces are defined by lapping surfaces.

3. A device as defined in claim 1 which is in the form of a milling cutter for shaping tool steel chasers and in which said surfaces are defined by milling tooth cutting edges.

References Cited by the Examiner

UNITED STATES PATENTS

| | | | |
|---|---|---|---|
| 1,656,595 | 1/28 | Merrifield | 76—101 |
| 1,989,667 | 2/35 | Covill | 29—103 |
| 2,208,811 | 7/40 | Kiehne | 76—101 |
| 2,262,353 | 11/41 | Butters | 29—103 |
| 3,059,317 | 10/62 | Pomernacki | 29—103 |
| 3,111,865 | 11/63 | Wildhaber | 51—288 |

WILLIAM W. DYER, Jr., *Primary Examiner.*

ANDREW R. JUHASZ, *Examiner.*